United States Patent
Stüven

(10) Patent No.: US 11,561,382 B2
(45) Date of Patent: Jan. 24, 2023

(54) LIGHTING DEVICE FOR AN IMAGING OPTICAL DEVICE, AND DETECTION METHOD

(71) Applicant: SCHOTT AG, Mainz (DE)

(72) Inventor: Theis Stüven, Wiesbaden (DE)

(73) Assignee: SCHOTT AG, Mainz (DE)

( * ) Notice: Subject to any disclaimer, the term of this patent is extended or adjusted under 35 U.S.C. 154(b) by 384 days.

(21) Appl. No.: 16/751,236

(22) Filed: Jan. 24, 2020

(65) Prior Publication Data

US 2020/0241270 A1 Jul. 30, 2020

(30) Foreign Application Priority Data

Jan. 24, 2019 (DE) ................. 10 2019 101 734.3

(51) Int. Cl.
G02B 21/00 (2006.01)
(52) U.S. Cl.
CPC ..... *G02B 21/0032* (2013.01); *G02B 21/0068* (2013.01); *G02B 21/0076* (2013.01)
(58) Field of Classification Search
CPC ............ G02B 21/0032; G02B 21/0068; G02B 21/0076; G02B 21/0092; G02B 21/084; G02B 21/14; G02B 21/16; G02B 21/18; G02B 21/125; G02B 27/0075
See application file for complete search history.

(56) References Cited

U.S. PATENT DOCUMENTS

| | | |
|---|---|---|
| 2005/0225851 A1 | 10/2005 | Koerner |
| 2007/0146870 A1 | 6/2007 | Metzger |
| 2009/0129115 A1* | 5/2009 | Fine ........................ F21V 13/08 362/606 |
| 2010/0302630 A1* | 12/2010 | Paulus ................... G02B 21/06 359/385 |
| 2013/0170024 A1 | 7/2013 | Teplitz |
| 2014/0368903 A1* | 12/2014 | Tanner .................... G02B 21/24 33/263 |
| 2016/0363753 A1 | 12/2016 | Todd |
| 2018/0259764 A1* | 9/2018 | Watanabe .............. G02B 21/36 |
| 2019/0004304 A1 | 1/2019 | Gaiduk |

FOREIGN PATENT DOCUMENTS

| | | |
|---|---|---|
| DE | 102004017694 | 9/2005 |
| DE | 102005062439 | 5/2007 |
| DE | 202009014694 | 2/2010 |
| WO | 2011125936 | 10/2011 |
| WO | 2014199339 | 12/2014 |
| WO | 2016201177 | 12/2016 |
| WO | 2017109053 | 6/2017 |

OTHER PUBLICATIONS

ISO 16232—"Road Vehicles—Cleanliness of components and systems", First Edition, Dec. 2018, Appendix H, pp. 158-167.
Ganse, "Polarization Microscopy", VEB Verlag Technik, Berlin, 1973.

* cited by examiner

*Primary Examiner* — Mustak Choudhury
(74) *Attorney, Agent, or Firm* — Ruggiero McAllister & McMahon LLC

(57) ABSTRACT

A lighting device for an imaging optical device such as a microscope is provided. The lighting device illuminates an object to be analyzed in an imaging optical device for microscopic analysis in at least two different contrasting techniques. The lighting device has light sources for the illumination, where the light sources are associated with a contrasting technique are controllable independently from each other.

15 Claims, 7 Drawing Sheets

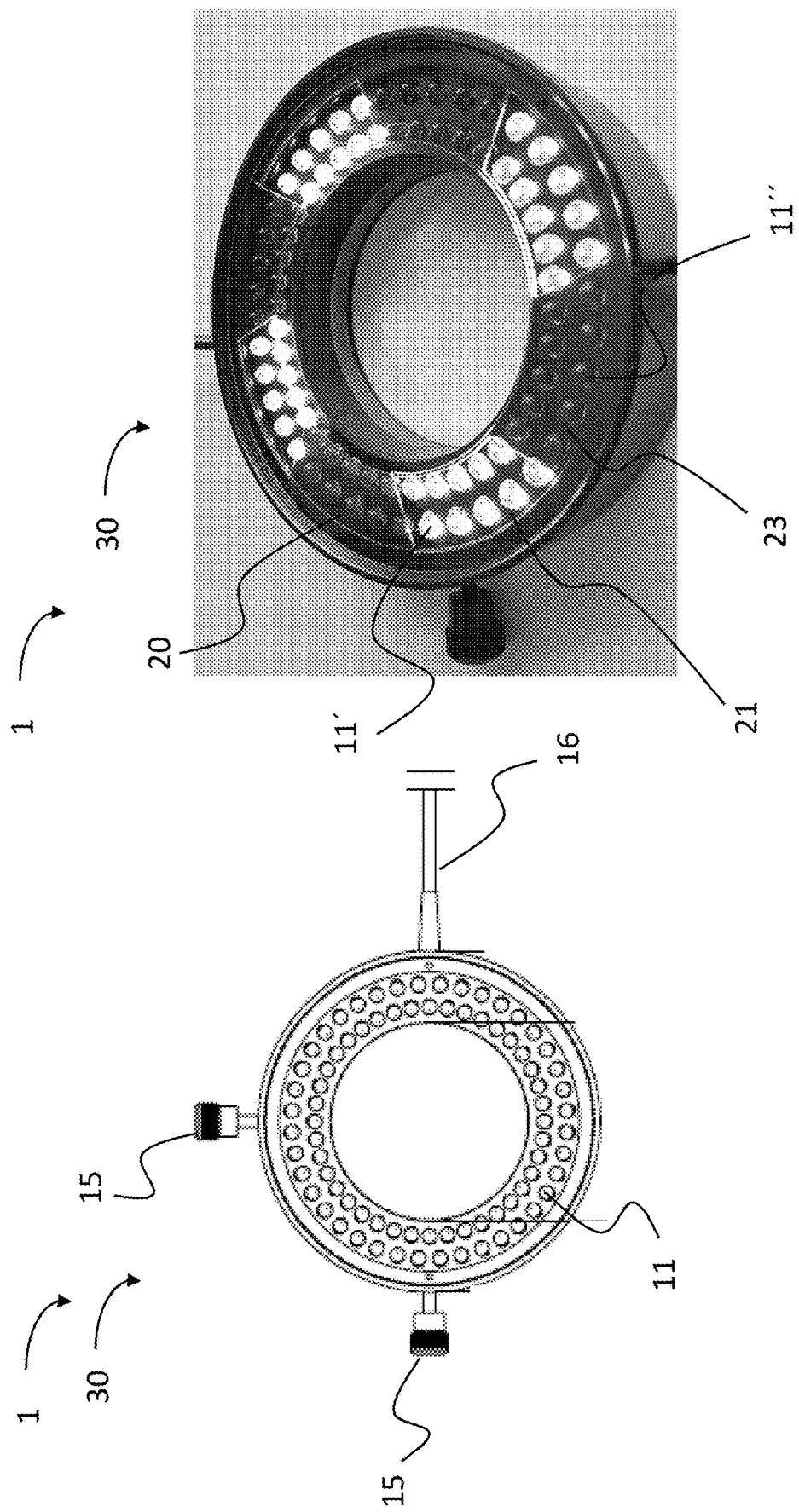

LIGHTING DEVICE FOR AN IMAGING OPTICAL DEVICE, AND DETECTION METHOD

CROSS REFERENCE TO RELATED APPLICATIONS

This application claims benefit under 35 USC § 119 of German Application 10 2019 101 734.3 filed Jan. 24, 2019, the entire contents of which are incorporated herein by reference.

BACKGROUND

1. Field of the Invention

The present invention relates to a lighting device for an imaging optical device, preferably a magnifying optical device such as a microscope. The invention furthermore relates to a detection method, for example for particles, in particular metallic particles, for example in conjunction with an analysis of cleanliness of surfaces or residual contamination analysis, or of cracks.

2. Description of Related Art

The requirements on quality assurance of components and consequently the requirements on cleanliness of such components have steadily increased in recent years in many technical fields. For example, what is known as "Clean Manufacturing" is a central issue in the field of manufacture of vehicles or higher-value systems and devices, for example in the chemical or medical sector. This is based on the understanding that functionality and service life of many components are directly related to particulate contamination, such as contamination with foreign particles, for example. Such contamination may be caused at many points in the production process.

Early and complete detection of contamination, both qualitatively and quantitatively, can make a major contribution to improving the associated production processes and ensuring or even enhancing the quality of the products.

Thus, there is a need to identify particulate residues and analyze them, especially with regard to cleanliness-critical contaminants. For this purpose, suitable measuring methods and devices are required.

In the automotive industry, for example, the relevant regulations VDA volume 19 and ISO 16232 list methods and devices which are intended to contribute to ensuring product quality. Accordingly, in addition to the size and the number of particles, their mechanical or electrical material properties are also important for determining cleanliness.

Given this background, the determination of particulate material is an important criterion for describing the cleanliness of a component. For determining the cleanliness of a component, the latter can be washed with a rinsing liquid according to an acknowledged procedure. After washing, the rinsing liquid can be gathered and preferably completely passed through a filter, so that the rinsing liquid flows through the filter and any contained particles will then remain on the filter surface. Subsequently, this filter can then be analyzed by microscopic techniques as part of a particle analysis. Suitable methods for this purpose include the optical contrasting techniques of light microscopy.

A method for particle analysis is described in document DE 10 2005 062 439 A1, according to which part of a particle accumulation on a planar substrate is illuminated and imaged, wherein a measurement area of the particle accumulation is displaced grid by grid and image data obtained on the measurement surface are evaluated with respect to the particle properties. In order to be able to identify metallic particles, it is proposed to use, in addition to a fixed analyzer, a rotatable polarizer which can be rotated back and forth between two different positions, using a servomotor. Consequently, two images can be generated: one in bright-field with parallel alignment of analyzer and polarizer, and one in polarization, when analyzer and polarizer are crossed relative to each other.

However, a polarizer rotated by a motor needs a certain amount of time for the rotation, so that the time for carrying out an analysis, in particular for a complete analysis including a multitude of measurement areas to be analyzed, is extended by a not inconsiderable amount. Moreover, mechanical rotation of the polarizer is less reproducible and is susceptible to wear, since moving parts are involved. Furthermore, slight vibrations are arising on the microscope in practice, which lead to "blurring" and may reduce image acquisition quality. In addition, partial polarization of the light may already occur in the bright-field, if the analyzer and polarizer are not aligned exactly in parallel.

Another method for particle analysis is described in document DE 20 2009 014 694 U1. This document proposes to analyze a filter membrane by means of a microscope using a ring light, which ring light has an outer and an inner LED ring. Again, two images of the filter membrane are generated, with different polarization. For this purpose, once the outer LED ring is switched on, and once the inner one.

This principle absolutely requires the use of ring lights comprising two concentric rings. This excludes very narrow configurations as required in what is known as "Slim Ring Lights", which are employed when a plurality of lenses are used on a microscope, inter alia. Another drawback is the fact that—due to the design—the object is illuminated once by the outer LED ring and once by the inner LED ring. Since the two rings are arranged concentrically around a center, this type of illumination for obtaining the two images causes the object to be analyzed to be illuminated at different inclination angles, since the light sources have a different distance to the center. This is unfavorable because, for example, the shadow of a raised object changes when exposed to point-like illumination at different angles, which may very quickly lead to measurement uncertainties and inaccuracies. Also, the brightness of the illuminated object may change when illuminated from different angles.

SUMMARY

It would therefore be desirable to have a method for optically analyzing an object by an imaging optical device, preferably using a contrasting technique, which avoids the aforementioned drawbacks.

Such method should allow to change the contrasting technique, for example in order to be able to detect metallic particles in a particle accumulation, but without requiring mechanical movement of components of the optical device for changing the contrasting technique.

The change of the contrasting technique should moreover be effected as quickly as possible and free of vibration, so that a section-wise analysis of rather large areas is also possible in a timely manner.

Furthermore, especially when changing the contrasting technique, the illumination, in particular the direction from which the object to be analyzed is illuminated should be homogeneous according to one embodiment of the invention, so that shadow cast and brightness of the object do not change when the contrasting technique is changed.

Finally, it should be possible in a simple and inexpensive manner to use and combine with one another different contrasting techniques, for example with illumination in bright-field, dark-field, with or without polarization, or else with fluorescence.

The inventors have addressed this problem as disclosed herein.

Accordingly, the subject-matter of the invention according to a first aspect includes a lighting device for illuminating an object to be analyzed, preferably for illuminating an object in an imaging optical device. The imaging optical device is preferably a magnifying imaging optical device for microscopic analysis, for example a microscope or a stereo microscope, and according to the invention at least two different contrasting techniques are employed during operation of the lighting device.

Such light-microscopic contrasting techniques include different illumination techniques which allow the object which is also referred to as a sample below to be displayed differently. By way of example, these include the following illumination techniques: bright-field, dark-field, polarization, oblique illumination, differential interference contrast, or fluorescence.

The lighting device according to the invention thus provides for illumination with at least two different illumination techniques and thus for microscopic analysis including at least two different contrasting techniques.

The lighting device in this case comprises a lighting assembly with a total number of at least two light sources which, in the operating state, are able to emit electromagnetic radiation of at least one wavelength and/or of a wavelength range and/or of a wavelength spectrum towards the object, wherein the total number of light sources is divided into segments each comprising at least one light source, wherein the number of segments corresponds at least to the number of contrasting techniques to be implemented, wherein the light sources of the segments are combined into at least a first and a second switched unit which can be controlled independently, preferably electronically, and wherein the light sources of a respective switched unit are associated with a respective contrasting technique. Thus, the contrasting techniques can be used alternately and/or at least partially simultaneously and independently of one another during operation.

In the context of the invention, wavelength spectrum is understood to mean a set of electromagnetic waves and may thus comprise electromagnetic radiation of one or more wavelengths and/or one or more wavelength ranges, for example electromagnetic radiation of a specific wavelength and electromagnetic radiation in a wavelength range.

The total number of light sources of the lighting assembly may be divided into segments each comprising at least one light source, the number of which amounts to at least the number of contrasting techniques to be implemented, or to a multiple thereof. In the case of two different contrasting techniques, the number of segments may then be at least two or more, for example three, or more preferably four or six or eight segments. Accordingly, a switched unit comprises at least one segment. A larger number of segments per switched unit, such as two or three segments, or preferably four or more segments, allows for a more homogeneous illumination of the object when changing from one contrasting technique to another.

In a favorable embodiment, each implementable contrasting technique and thus each switched unit comprises an equal number of segments. In this way it is possible to achieve an illumination that is also referred to as segmented illumination of an object below. For example, in the case of two implementable contrasting techniques, eight segments may be provided, in which case each switched unit may then include four segments, by way of example. In the case of three implementable contrasting techniques, nine or 12 segments may be provided, for example, in which case each switched unit may then comprise three or four segments, respectively.

The at least one light source of each segment can be combined evenly to form at least a first and a second switched unit, and the light sources assigned to the switched unit can preferably be controlled independently of each other, preferably electronically. This means that the electrical connection of the light sources is preferably implemented such that the light sources belonging to a first switched unit are switched on and off independently of those belonging to a second switched unit or else to a third switched unit, for example, or so that they can be modified in their luminous intensity or in another parameter independently of each other. In this way it is particularly easy to implement different contrasting techniques for microscopic analysis using the lighting device according to the invention, and to individually control them electronically.

The assignment of the segments to the switched units is preferably made such that non-adjacent segments are combined. For example, if the light sources are arranged in a row, a segmentation may be made into six segments, where the first, third, and fifth segments may be combined into a first switched unit and the second, fourth, and sixth segments may be combined into a second switched unit. A switched unit accordingly comprises preferably at least two non-adjacent segments.

According to the invention, each segment has an equal number of light sources, and/or the averaged angle of inclination, under which the light from the light sources of a segment is incident on the object is equal. Accordingly, each switched unit also comprises an equal number of light sources, and/or the averaged angle of inclination at which the light of the light sources of the segments of a switched unit is incident on the object is also equal, but this is not a mandatory requirement.

Therefore, in a particularly preferred embodiment, the at least one light source of each segment of the lighting device has the same distance to a center of the lighting device. Here, the center of the light-emitting surface of the light source can be taken as the reference point of the light source. In the case of a plurality of light sources per segment, the averaged distance resulting from the individual distances of the light sources of a segment to the center of the lighting device can be used in a simplifying manner. This means that the arrangement of the at least one light source is preferably the same within each segment.

In the case a segment comprises a plurality of light sources, averaged angle of inclination is understood to mean the angle of inclination resulting when the respective inclination angles of all the light sources of this segment are averaged. A different angle of inclination will result, for example, from a different distance of the light sources from the center of the lighting assembly if the emission direction of the light sources is aligned towards a common point, such as an object to be analyzed on a microscope slide. Here, emission direction refers to the direction in which the intensity of the emitted light is highest. The angle of inclination of an individual light source can then be determined between the emission direction of the light emitted by the light source and the surface normal of the microscope slide.

According to the invention, the contrasting techniques can be switched independently, for example alternately, during operation of the lighting device. In other words, this means that the lighting device makes it possible to change between at least two different illumination techniques for illuminating the object for microscopic analysis in the imaging optical device, and/or to enable at least one illumination technique to be switched on and off, optionally alternately, in addition to the at least one other illumination technique.

In a particularly preferred embodiment, the contrasting techniques include bright-field illumination and polarization illumination. In a further particularly preferred embodiment, the contrasting techniques comprise bright-field illumination and fluorescence illumination. In yet another particularly preferred embodiment, the contrasting techniques include bright-field illumination, fluorescence illumination, and polarization illumination.

The segmentation of the illumination according to the invention is particularly well suited to enable illumination with polarization as a contrasting technique, during operation. For this purpose, a polarizing element may advantageously be configured such that the light from the light sources of one switched unit passes through the polarizing element before being incident on the object and such that the light from the light sources of the other switched unit is directly directed onto the object, without polarization, without passing through the polarizing element. Accordingly, the light from the light sources of the first switched unit is polarized during operation and thus provides a polarized light for illuminating the object. For this purpose, the polarizing element may advantageously comprise a polarization filter which linearly polarizes the light from the light sources. The light from the light sources of the second switched unit is accordingly not polarized.

According to another embodiment it is contemplated to use, instead of or in addition to the polarizing element, light sources which are capable of emitting polarized light and/or which can be operated in a polarized mode. These might be special LEDs or lasers or laser diodes, for example, which can emit polarized light per se or in dependence on the operating parameters. Also within the scope of the invention are, as a matter of course, solutions which comprise combinations of a polarizing element and of light sources that are capable of emitting polarized light.

In this way, it is surprisingly easy to provide for illumination of an object to be analyzed, preferably illumination of an object in an imaging optical device for microscopic analysis, in which at least two different illumination techniques can be used independently during operation, and wherein one of the at least two different illumination techniques may comprise illumination with polarized electromagnetic radiation, i.e. polarization illumination. Each of the different illumination techniques corresponds to a respective contrasting technique.

A first illumination technique may then correspond to the illumination prevailing when the light sources of the first switched unit are in operation, and a second illumination state corresponds to the illumination during operation of the light sources of the second switched unit. It is likewise possible to combine light sources of segments so as to define three switched units, for example, in order to realize three different contrasting techniques. In this sense, an independent, for example alternate operation means that the light sources belonging to the one switched unit are switched on or the light sources belonging to the other switched unit are switched on.

Simply changing between at least two different contrasting options is often very helpful or even necessary for assessing material properties of the object being observed using an imaging optical device such as a microscope. Thus, the lighting device according to the invention most advantageously allows to implement at least two different contrasting techniques in a single imaging optical device, and the light sources of the associated switched units can be operated accordingly.

The operation may very advantageously involve individual activation of the light sources belonging to a switched unit or to the segments, for example by a computer unit which takes over the switching of and power supply for the respective light sources. The computer unit may be part of the lighting device, or may else be integrated into the imaging optical device. It is of course also possible to provide an external user interface, alternatively or in addition, so that an operator of the optical device may take over control of the switched units manually.

The lighting device according to the invention is therefore particularly well suited to be operated with an imaging optical device for microscopic analysis.

In this way, detection of, for example, metallic particles in a particle accumulation is surprisingly easy and reliable. Metallic particles in a particle accumulation can be detected through microscopic analysis, and in order to be able to distinguish the metallic particles from other particles, two different contrasting techniques are used for each respective identical image section. The lighting device according to the invention is particularly well suited for this purpose, for combining bright-field illumination and polarization illumination, as the contrasting techniques.

Illumination with polarization can contribute to the analysis of such particles. For example, in this case, the light linearly polarized by the polarizing element or polarizer is reflected by the particle, but not changed in its direction of oscillation. The direction of oscillation of the previously reflected polarized light is thereby oriented such that it is at least partially blocked or filtered out by the analyzer which is rotated by up to 90° relative to the polarizer, so that the particle will appear dark, for example, which accordingly allows to detect its dimensions and position, for example by means of image analysis software.

When the object is illuminated in bright-field, i.e. in the case of illumination using non-polarized light, metallic particles are visible due to their surface reflections which appear bright in this case. In both cases, illumination is preferably implemented in reflected light mode, i.e. the object is illuminated from the same direction from which it is observed.

This allows to determine the shape, geometry and position as well as the type of particle on the basis of at least two different images.

So, in this embodiment, the illumination of the object differs in that, depending on the contrasting technique set, the light is either passed through a polarizing element or is polarized in another way prior to being incident on the object, or not. If now two images of the object are compared with each other, the first image produced under illumination without polarization and the second image under illumination with polarization, these two images differ in their polarization setting. As a result, the objects or their surface will appear black on the second image, for example, whereas metallic particles will show a glossy surface and associated reflections in the first image, in particular they will appear bright and thus be distinguishable from the second image, thereby becoming distinguishable from other, non-metallic particles. It will be appreciated that this principle can be applied to any particles which, by their nature, provide different images distinguishable from the background, for example the substrate on which they rest, under polarized and non-polarized light or any other combination of contrasting techniques.

The images of the object to be analyzed in the imaging optical device can be viewed either by the eyes of an operator through the eyepieces, or by a digital or video camera which captures the images. For this purpose, a computer unit may be provided which can store the captured images.

Of course, an image analysis software or other computer-aided analysis methods may additionally be used, which may include appropriate differential techniques for image analysis, for example, so as to allow for automatic detection of metallic particles. The distinction of metallic particles from non-metallic particles may thus be made on the basis of reflection behavior. In addition to quantitative analysis, this also provides a qualitative analysis of the material properties. The corresponding software may be integrated in the computer unit, for example.

The invention thus provides a lighting device for illuminating an object to be analyzed, preferably for use in an imaging optical device for optical, in particular (light-) microscopic analysis, which makes it possible to change between at least two contrasting techniques in a particularly simple and rapid manner without involving mechanical processes. This is exploited to produce at least two different images of the object under different illumination.

In the aforementioned example, the illumination differs in terms of polarization in the analysis by two different contrasting techniques in this case, which polarization is switched on and off by switching from one contrasting technique to the other. Of course, it is also possible to bring about a change in illumination during the analysis by the selected contrasting techniques through a change in the wavelength of the electromagnetic radiation of the light sources. This is achieved surprisingly easily if the wavelength, the wavelength range, or the wavelength spectrum of the electromagnetic radiation of the light sources are selected as a function of the respective segments or switched units. For example, if a contrasting technique shall involve bright-field illumination, the light sources associated with this switched unit may advantageously emit electromagnetic radiation in the visible wavelength range.

Furthermore, if a contrasting technique shall allow illumination under fluorescence, then the light sources associated with this switched unit may advantageously emit electromagnetic radiation in the UV wavelength range, for example.

In a preferred embodiment of the invention, a contrasting technique accordingly comprises at least illumination under fluorescence, preferably in the form of UV bright-field illumination. This may be combined with at least one further contrasting technique in different ways, for example with normal bright-field illumination and/or with illumination with polarization.

According to the invention, in the case of such a configuration of the lighting device with a UV contrasting technique, the number of light sources that each segment and thus the respective switched unit comprises, and/or the averaged angle of inclination at which the light from the light sources of a segment is incident on the object, is again preferably the same. In this way, a sample can particularly advantageously be analyzed both under illumination with fluorescence and under at least one further contrasting technique, while making it possible to provide consistent, comparable illumination with preferably the same averaged angles of inclination.

In a particularly simple way, the light sources of the switched unit which are assigned to the contrasting technique with fluorescence may be implemented as UV light sources for this purpose, that is to say they may be adapted to emit electromagnetic radiation in the UV wavelength range. Thus, the lighting device according to the invention is also suitable for use in or with fluorescence microscopy techniques. For example LEDs that emit electromagnetic radiation in the UV wavelength range can be used as the UV light sources here.

One problem with UV contrasting techniques may, on the one hand, be the danger to the human eye, since this form of electromagnetic radiation is not visible to the human eye, but might lead to irreparable damage. On the other hand, when using UV light sources, the captured image may be displayed incorrectly if a digital or video camera is employed to acquire images of the object, for example. This applies for example to cameras which are already sensitive in the ultraviolet wavelength spectrum, for example at a wavelength of approximately 380 nm and below. In such cameras, an undesired or falsifying addition of the UV excitation signal and the fluorescence signal to be detected, which lies in the visible range, for example, may be caused in the case of a contrasting technique with fluorescence, for example, which may result in blurring and, in the case of color cameras, in faulty colors.

According to the invention, it is therefore contemplated for the lighting device for illuminating an object to be analyzed and/or the imaging optical device for optical, in particular (light) microscopic analysis, such as a stereomicroscope, to be equipped with an appropriate blocking filter, in particular a UV blocking filter. The blocking filter, in particular the UV blocking filter, is able to block undesired electromagnetic radiation, in particular in the ultraviolet wavelength spectrum.

Particularly advantageously, UV light sources with a narrow-band emission characteristic may be chosen as the light sources for the ultraviolet excitation light in the sense of the invention. Here, narrow-band is understood to mean a range of 50 nm or less, preferably 30 nm or less, and most preferably 10 nm or less. Such an embodiment of the invention makes it possible to dispense with the excitation filter, which makes the UV blocking filter and thus the lighting device according to the invention more cost-effective.

Thus, the contrasting techniques of the lighting device according to the invention may differ in wavelength, in wavelength range, or in wavelength spectrum of the electromagnetic radiation used to irradiate the object, and/or in polarization.

The switching between the contrasting techniques is preferably achieved electronically, which makes it possible to quickly switch back and forth between the contrasting techniques within very short time intervals. In the present context, "quickly" means that it takes less than 500 milliseconds, preferably less than 300 milliseconds, and most preferably less than 100 milliseconds for switching the lighting device from one contrasting technique to another. All light sources of a switched unit are thus switched simultaneously within this time, and the light sources of different switched units are switched independently of each other. Mechanically moving elements such as servomotors or displacing means allowing to change between the two polarization settings are not required according to the invention. This offers several advantages.

First, the setting process is maintenance-free, since there are no moving parts. On the other hand, the change between the two contrasting techniques may be achieved merely by a simple switching operation of the computer unit or by an electrical signal, so that the switching can be achieved virtually without loss of time and only involves synchronized alternate switching on or off of the light sources of a switched unit. This makes it possible to analyze even a large number of images or image sections alternately in virtually no time.

By segmenting the total number of light sources of the lighting assembly into segments or switched units each preferably comprising an equal number of light sources, and by controlling them via controllers or software, it is moreover possible to illuminate the object with uniform brightness and at equal angles, if the intensities of the light sources are adapted via the controller or the software. This allows, for example, to compensate for different illuminance of the object, for example due to a loss in intensity in the case of polarized illumination. Moreover, this is very eye-friendly for an operator of the optical device, since a constant change between different degrees of brightness when viewing through the eyepiece can quickly lead to fatigue and thus to errors in the analysis. And if evaluation is done using a camera, the latter does not have to switch back and forth between different exposure times and can therefore be operated faster and easier.

In an advantageous embodiment, the luminous intensities of the illumination modes or of the different contrasting techniques are therefore matched or else are tunable during operation, so that the object to be illuminated is preferably illuminated with approximately equal, preferably constant illuminance or predetermined illuminance in each illumination technique, i.e. each contrasting technique. Consequently, the luminous intensity of the light sources of at least one switched unit, preferably of all switched units, is adjustable.

For example, it is possible to provide a different luminous intensity in a contrasting technique without polarization than in a contrasting technique with polarization and to increase the luminous intensity in the latter, since the light beams of the light sources will otherwise be attenuated due to the polarizing element in the beam path, so that the luminous flux incident on the object would be lower.

Furthermore, a control algorithm may be employed, which automatically adjusts luminance when switching between cross polarization and bright-field illumination, so that the objects appear equally bright when being viewed or when capturing images. This moreover helps to eliminate the adjustment of exposure time of the camera or to reduce the adaptation time of the eye.

In a further embodiment of the invention it is therefore contemplated to adapt the brightness of the light sources as a function of the selected contrasting technique, for example by reducing, during operation, the intensity of those light sources which radiate directly onto the object, for example by shading, filtering or electronic dimming, while the light sources from which light passes through the polarizing element are not reduced or adapted or modified in any other way during operation. Of course, it is also possible to use light sources of different brightness, but this is considered to be more complex. The goal is to keep illumination intensity as constant as possible throughout the different contrasting techniques by the adaptation, so that a constant luminous flux per unit area is obtained on the object and so that the lux value remains approximately the same or as constant as possible during different contrasting techniques. Approximately the same in this sense means that the luminous flux per unit area on the object differs by not more than 20%, preferably not more than 15%, and more preferably by not more than 10% from each other when changing between at least two different contrasting techniques, and that the object to be illuminated is illuminated with an approximately equal illuminance during the different illumination techniques.

In summary, the switching between the at least two contrasting techniques according to the invention is much faster and more accurate than known motorized or manual switching operations. Furthermore, no parts are moved on the microscope when changing the observation techniques, which is why no vibrations are generated on the system. Such vibrations increase the time it takes for image acquisition, since decay times of a vibration must be taken into account before image acquisition.

Conventionally, microscopes are nowadays delivered with a manually rotated polarizer. The invention now allows for operation via a manually controlled external user interface or via a computer unit such as a PC using suitable software, instead of manual intervention by grasping and rotating the polarizer on the device. This reduces vibrations on the device and improves the ergonomics of the working steps.

Together, these two aspects make it possible to save a significant amount of time in automated measurement, such as in the case of residual contamination analysis known as "cleanliness" in compliance with DIN 16232.

Another advantage of a lighting device according to the invention is the possibility of being used outside of automated image analysis systems.

Another advantage is the constant contrasting of the object. In the prior art methods, such as described in document DE 20 2009 014 694 U1, the light is incident on the object to be examined from different angles of inclination. These (inclination) angles for illumination of the object always change simultaneously with the changing of the illumination technique, which in addition to the polarization effect also leads to an altered contrast behavior of the object. The lighting device of the invention avoids this drawback by the segmentation of the light sources, which makes it possible to keep the inclination angle equal or adjust it so as to be equal even under different illumination caused by the different contrasting techniques.

The lighting assembly according to the invention is preferably provided in the form of a ring light, i.e. of annular design, or comprises at least one ring light. Ring lights, i.e. light sources usually arranged annularly around the objective lens, are particularly well suited for homogeneous illumination of objects especially in imaging optical devices such as a microscope. They allow for illumination of the object in the examination area in the reflected light mode, i.e. in the image field or measurement area of the device, in which an object to be analyzed is optically detectable. In the case of a microscope or stereo microscope, the ring light is preferably attached to the objective lens.

A suitable ring light may comprise at least one row of annularly arranged light sources which are arranged in a regular arrangement equally spaced from one another concentrically around a center. In order to achieve greater brightness, it is also possible to provide a plurality of rows of annularly arranged light sources, which are arranged in two or even more rows in a regular arrangement equally spaced from one another concentrically around a center.

If a contrasting technique with fluorescence is intended, the ring light may particularly favorably already be implemented with an integrated UV blocking filter, which serves both to protect the eyes of the user when looking through the eyepieces and to significantly improve the image when operating with a camera. This makes it possible, for example, to use a digital or video camera to acquire images or image sequences without the need for this camera to be equipped with integrated blocking filters, in particular UV blocking filters. In this way, the contrasting technique with fluorescence can be very easily integrated into the lighting device without the need for further complex adaptations to the optical device.

The light sources may comprise fiber-optic light guides, but preferably semiconductor-based light sources, preferably light-emitting diodes (LEDs) and/or laser diodes, most preferably LED light sources or fiber-optic light guides having such light sources associated therewith. In particular white LED light sources allow for a bright and homogeneous illumination of the object. For the purposes of the invention, the light sources of a switched unit are selected as a function of the desired contrasting technique. This means that, for example for bright-field illumination, light sources are selected which emit electromagnetic radiation of at least one wavelength in the visible wavelength range, that is in a range of electromagnetic radiation from about 380 to 780 nm, which is visible to human beings. In principle, however, the proposed principle of segmented illumination is also suitable for radiation sources which, in the operating state, emit electromagnetic radiation of at least one wavelength in other wavelength ranges, for example in the UV or IR ranges. In one embodiment, appropriate filter elements can furthermore be used for selecting specific wavelengths from a wavelength spectrum emitted by the light sources.

In contrasting techniques involving polarization, the polarizing element is preferably arranged in the beam path of the light sources and designed such that only light from the light sources of the switched unit assigned to this contrasting technique passes through the polarizing element before being incident on the object. The light from the light sources of the other switched units can be directly directed to the object, provided that the associated contrasting technique does not require polarized light.

In a particularly preferred embodiment, the polarizing element may be integrally formed for this purpose, and may comprise openings which are arranged such that they are aligned with the beam path of the light beams from the light sources of the switched unit, which are to be incident directly on the object. The polarizing element may therefore have openings which are aligned with the corresponding beam paths of the light sources. The perforation or segmentation of the polarizing element is therefore preferably matched to the segmented illumination of the lighting assembly.

Particularly simply, the polarizing element may comprise a polarizing film. The openings can then be produced very easily, for example by punching. The polarizing element may be annular and may have external dimensions adapted to the dimensions of the ring light, so that the ring light and the polarizing element may be provided as an assembly for versatile use on different imaging optical devices.

Typical ring lights may have an outer diameter in a range from 30 to 130 mm or even more. The center opening of the ring light may accordingly have a diameter in a range from 18 to 110 mm. They may provide high brightness, for example an illuminance of 110 klx at a distance of 85 mm, or an illuminance of 300 klx at a distance of 30 mm, or even more. At a distance of 50 mm, illuminance is preferably at least 100 klx, more preferably at least 110 klx, and most preferably at least 120 klx. This enables bright and homogeneous illumination of the object.

The outer diameter of the polarizing element is also in a range from 30 to 130 mm or more and is preferably adapted to the outer diameter of the ring light. If provided in the form of a polarizing film, it can be kept very thin and have a thickness of less than 5 mm, preferably less than 3 mm, most preferably less than 1 mm. It is preferably mounted at a small distance from the ring light in order to avoid diffraction effects when the light passes through the openings, for example, and to minimize space requirements. The spacing between the polarizing element and the light sources of the lighting assembly is chosen such that the emission cone of the light sources is preferably covered. This prevents false light from reaching the object, for example light from light sources passing through the openings to reach the object, which should pass through the polarizing element.

The lighting device according to the invention can be flexibly combined with a variety of ring light designs. This enables them to be used for microscopes, especially for stereo microscopes, for example, also for ring lights for stereomicroscopes that have a plurality of objective lenses simultaneously mounted on a lens revolver, in which case particularly narrow ring lights are used.

The invention also encompasses a method for illuminating an object, preferably for illuminating an object to be analyzed in the measurement area of a magnifying optical device, in which the object is illuminated by a lighting device alternately using at least a first and a second contrasting technique so as to allow for an analysis under at least two different contrasting techniques.

Switching between the contrasting techniques is achieved purely electrically. Particularly advantageously, the method for illuminating an object uses the lighting device described above.

The invention also includes a method for optical analysis of an object, for example for residual contamination analysis, in which an object to be analyzed is placed in the measurement area of a magnifying optical device and the object is illuminated by a lighting device alternately using different contrasting techniques.

For the analysis of the object, at least two images of the same image section and the same viewing direction can be used and compared, however, the at least two images are produced using different contrasting techniques. The method for illuminating according to the invention and/or a lighting device according to the invention can be used particularly advantageously for illumination for the method for optical analysis of an object.

Although a change between only two different contrasting techniques using the segmented illumination has mostly been discussed above, it will be apparent that with an appropriate segmentation of the lighting assembly and also the polarizing element it is possible to implement more than two, for example three or four different contrasting techniques with the lighting device according to the invention, and in this case individual independently switchable light sources of the respective associated switched unit will be available for each intended contrasting technique.

For example, it is conceivable to integrate a third contrasting technique based on UV radiation, and in this case the number of segments is determined to be at least three or a multiple of three. These segments may then alternately be combined into three switched units, wherein the polarizing element and the light sources of the first switched unit may be adapted to emit polarized light, those of the second switched unit may be adapted to emit non-polarized light, and those of the third switched unit may be adapted to emit UV light. Accordingly, the light sources of the third switched unit can comprise UV light sources, and the polarizing element may most advantageously have openings for the beam paths of these UV light sources.

It will be apparent to a person skilled in the art that this provides for a variety of possible combinations for realizing different contrasting techniques.

The object may be a single sample, such as a filter or a filter membrane, which is placed in the measurement area of the imaging optical device, i.e. placed on the microscope slide, for example. For analysis, i.e. during operation of the imaging optical device, the sample is then illuminated accordingly by the segmented lighting device. As a matter of course it is also possible to analyze surfaces of articles or components, for example pipes, silicon wafers, or of glass or glass sheets.

In the field of residual contamination analysis, complementary procedures are known, for example for detecting metallic particles in a particle accumulation. For the latter purpose it is known to wash a potentially particle-containing sample using a rinsing liquid and subsequently collect this rinsing liquid as completely as possible and then passed it through a liquid-permeable flat substrate, for example a filter membrane. In the case of contamination of the sample, the filter membrane surface will then be contaminated with particles in the area where the liquid passed therethrough, and can subsequently be analyzed. For this purpose, the method of the invention can be employed particularly advantageously for the analysis. The object, for example the filter membrane, may be disposed stationary in the measurement area of the magnifying optical device in this case.

In the case of a planar substrate which projects beyond the imaged area of the magnifying optical device it is however advisable to perform an analysis of the object section by section, in a rastering fashion, so as to section-wise analyze the entire object. For this purpose, the magnifying optical device may be equipped with a suitable displacement mechanism which preferably also enables automatic operation. This automatic operation for section-wise analysis of the object is preferably coupled with the illumination, i.e. with the lighting device, so that the at least two different contrasting techniques can be applied directly for each section of the image, for analysis.

In other words, in particular for larger objects in the measurement area, such as a filter membrane, the method for optical analysis according to the invention may be implemented such that this object is analyzed automatically by scanning, by sequentially automatically subjecting each image section of the object to the intended contrasting techniques, such as polarized light and non-polarized light. The comparing of the at least two images per image section may then be achieved in a computer-assisted manner in a computer unit.

The method according to the invention thus makes it possible to perform a fully automatic analysis of a filter membrane in the context of a residual contamination analysis, in which the filter membrane can be alternately exposed to polarized and non-polarized light. The rapid, purely electrical switching between the contrasting techniques makes it possible to analyze the entire object on the basis of the intended contrasting techniques in only a single pass. It is in particular not necessary to first produce a first series of images of the object with a first contrasting technique and then a second series of images of the object with a second contrasting technique, which would involve the drawback of having to address each image section of the object twice so that the entire object is scanned twice in rastering fashion. The inventive method thus allows to detect metallic particles among a particle accumulation on the filter membrane in a particularly simple and reliable way.

Finally, the invention also encompasses an imaging optical device for the microscopic analysis of an object, comprising a microscope, a stereo microscope, a macroscope, a digital microscope, or a similar device. The imaging optical device preferably comprises a lighting device according to the invention as discussed above.

The imaging optical device may be combined with other components to form an optical system comprising a computer or evaluation unit. Also, advantageously, a displacement mechanism may be provided, which allows to displace the object section by section, so that even rather large objects can be analyzed section-wise.

Further details of the invention will become apparent from the description of the illustrated exemplary embodiments and the appended claims.

BRIEF DESCRIPTION OF THE DRAWINGS

In the drawings:

FIG. 4 shows a plan view of a ring light comprising two rows of annularly arranged light sources;

FIG. 5 shows a perspective view of a ring light comprising two rows of annularly arranged light sources, in operation;

DETAILED DESCRIPTION

Figure 2:
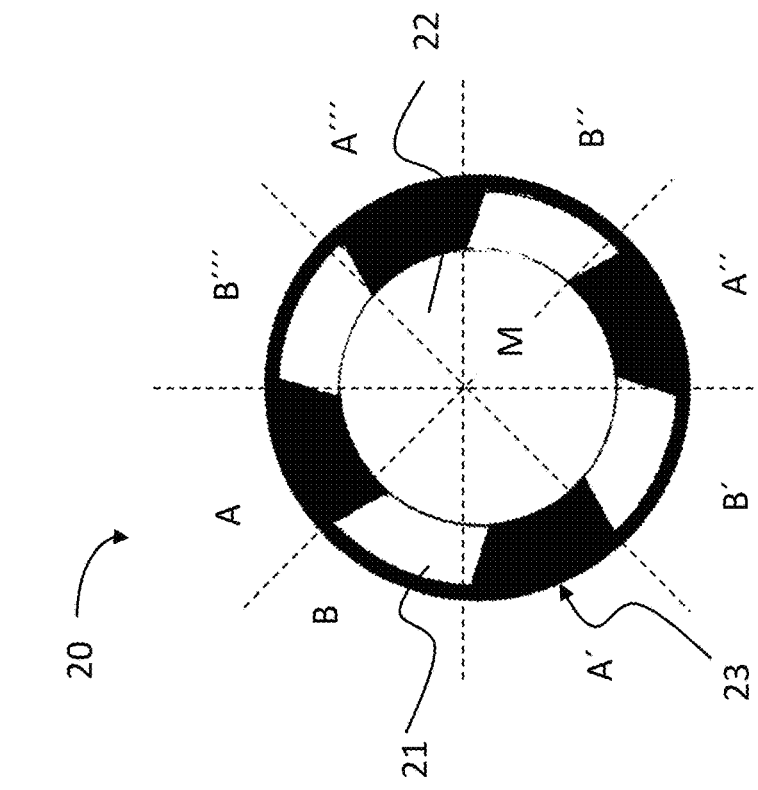
FIG. 2 shows a plan view of a polarizing element.

In the following detailed description of preferred embodiments, for the sake of clarity, the same reference numerals designate substantially similar parts in or of these embodiments. However, for the sake of better understanding of the invention, the preferred embodiments illustrated in the figures are not always drawn to scale.

The subject-matter of the invention encompasses a lighting device 1 for illuminating an object to be analyzed, preferably for illuminating an object in an imaging optical device. Such an imaging optical device is preferably a magnifying imaging optical device for microscopic analysis under different contrasting techniques, such as a microscope or a stereo microscope as shown in a schematic overview of an optical system in FIG. 6, merely by way of example.

The lighting device 1 according to the invention allows to use at least two different contrasting techniques for analysis. These at least two different contrasting techniques differ in wavelength of the electromagnetic radiation of the light sources and/or in the polarization of the light to which the object to be analyzed is exposed. The contrasting techniques comprise at least one of the following illumination techniques: bright-field, dark-field, polarization, oblique illumination, or fluorescence.

Bright-field illumination refers to an illumination in which a flat observation plane is illuminated in such a way that at least part of the light reflected on a sample is incident on the optics. The flat sample background thereby appears "bright" in the image.

By contrast, dark-field illumination refers to an illumination of the sample under an illumination angle that is shallower than the opening angle of the objective lens. As a result, none of the incident light will be incident on the optics, a flat sample or the flat background will therefore remain "dark". Only elevations on the sample (e.g. due to particles) will cause the incident light to be reflected at a different angle so that it may be incident on the optics. Therefore, edges or the contours of elevations, for example, will be displayed bright.

In the present sense, illumination with polarization means that the light from the light source is polarized before it is incident on the object, and for this purpose, a polarizing element may be provided, for example a polarization filter. The polarizing element is adapted to polarize the light from the light source, in particular linearly. For implementing the contrasting technique with polarization, an analyzer has moreover to be provided at a suitable location in the optical system.

Oblique illumination generally means illumination with a main emission direction from the light source not perpendicular to the object, but directed towards the object at an angle or angle of inclination. Oblique illumination can achieve enhanced contrast.

Illumination under fluorescence means excitation of a sample with electromagnetic radiation in the ultraviolet wavelength range, for example, whereby fluorescent substances of the sample will then emit light of other, longer wavelengths (Stokes shift). Fluorescence can also be excited by wavelength ranges other than UV.

Figure 1:
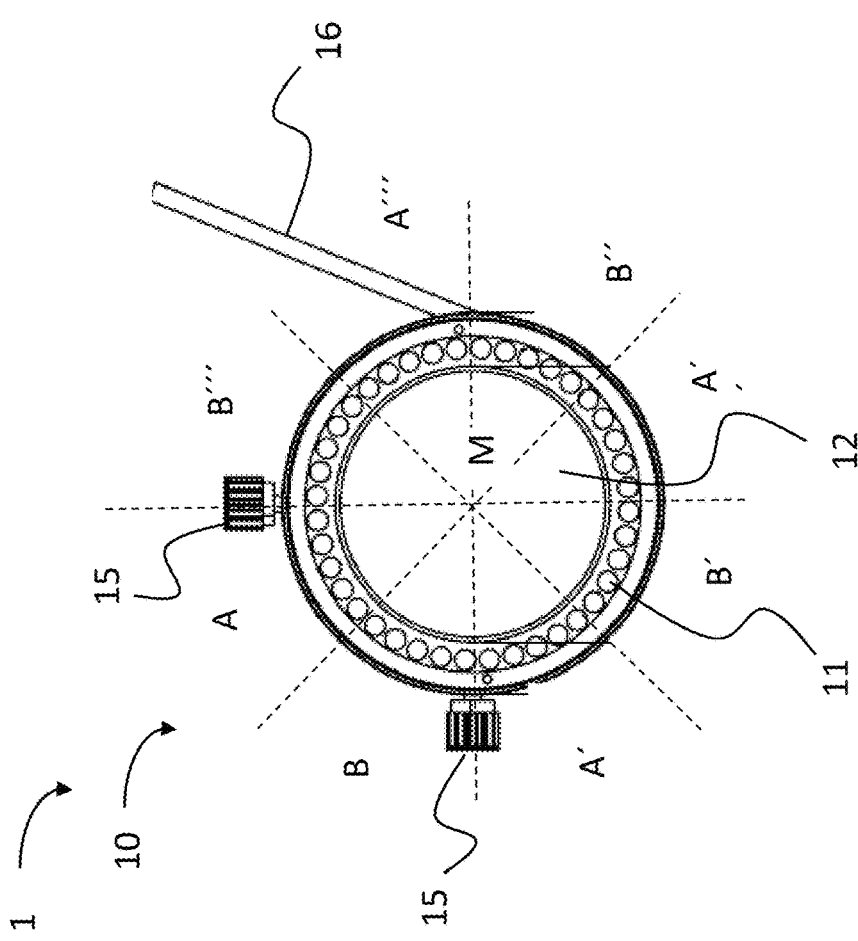
FIG. 1 shows a plan view of a ring light comprising a row of annularly arranged light sources.

One embodiment of a lighting device 1 will now be described in more detail, merely by way of example. The embodiment of the lighting device 1 as shown in FIG. 1 uses bright-field illumination on the one hand and illumination with polarization on the other hand.

It is of course possible within the context of the invention to combine other illumination techniques, for example bright-field illumination with fluorescence illumination as will be shown further below in FIG. 9a by way of another embodiment of a lighting device 1. It should be noted at this point that the embodiments comprising a polarizing element as described below are not mandatory for the invention, but rather represent a particularly favorable embodiment for a contrasting technique with polarization illumination.

In the example, the lighting device comprises a lighting assembly with a total number of at least two light sources which are operable to emit electromagnetic radiation towards the object, and a polarizing element which is arranged in the beam path between the lighting assembly and the object.

Light sources suitable for the invention include semiconductor-based light sources, preferably light-emitting diodes (LEDs) and/or laser diodes, most preferably LED light sources or fiber-optic light guides having such light sources associated therewith.

A favorable lighting assembly with an annular arrangement of light sources 11 is shown in FIG. 1. The annular arrangement of light sources 11 shown here is also referred to as a ring light 10 and is shown in a plan view, and the ring light 10 comprises a series of annularly arranged light sources 11 which are arranged in a regular arrangement equally spaced from each other, concentrically around a center M. The area surrounding the center of the ring light 10 comprises a circular opening 12, so that a view through the ring light 10 is well possible.

In the present exemplary embodiment, the lighting assembly of the ring light 10 comprises a total number of 40 white LED light sources.

In view of the segmentation of the light sources 11 it is favorable if their number corresponds at least to the number of contrasting techniques provided or is a multiple thereof. In the case of two contrasting techniques, they should therefore be provided in a number of at least two or preferably a multiple of two.

The exemplary white LED light sources 11 provide for a bright, homogeneous, and energy-saving illumination of an object, for example in the measurement area of a microscope. For this purpose, the light sources 11 are operable to emit and direct electromagnetic radiation towards the object.

The ring light 10 comprises connection lines 16 shown purely schematically, which allow for electrical connection and control of the light sources 11. The ring light 10 of the exemplary embodiment furthermore comprises two adjusting wheels 15 which allow to manually adjust the luminous intensity of the light sources 11.

The total number of 40 light sources 11 of the annular lighting assembly of ring light 10 is symmetrically divided into a total of eight segments A, A', A'', A''', B, B', B'', B''' in this exemplary embodiment. In the illustration, the individual segments are delimited by dashed lines. It will be apparent for a person skilled in the art that both the number of light sources 11 and their division into eight segments only represents one exemplary embodiment and that other segmentations may be both possible and useful. A larger number of light sources per segment and/or a larger number of segments per switched unit allow for an overall better, more homogeneous illumination of the object.

The light sources 11 of the eight segments are alternately combined into a first and a second switched unit. In the example, light sources of the segments A, A', A'', A''' belong to the first switched unit, and light sources of the segments B, B', B'', B''' belong to the second switched unit. Here, the light sources belonging to a switched unit, that is to say the light sources of the segments A, A', A'', A''' and the light sources of the segments B, B', B'', B''', can be controlled independently of one another. The division of the 40 light sources into the eight segments is made evenly, so that each segment A, A', A'', A''', B, B', B'', B''' comprises the same number of light sources 11 belonging thereto. In the example with a total number of 40 light sources, the number of light sources 11 per segment is 5 light sources 11 per segment A, A', A', A''', B, B', B'', B'''. The assignment of the light sources 11 of the segments to the two switched units is chosen such that the non-adjacent segments are combined to define a switched unit.

For the purposes of the invention, high homogeneity is sought in the illumination of the object under the intended contrasting techniques. Preferably, therefore, the number of segments per contrasting technique is at least two or better a multiple of two, in order to achieve high homogeneity even with segmented illumination. For two contrasting techniques, such as polarized and non-polarized illumination, a total of eight segments has been found to be very advantageous in terms of both controllability and homogeneity of light and avoidance of shadow casting. Thus, each of the two switched units comprises exactly four segments in this case, with non-adjacent segments being combined.

The background for this is as follows: A ring light has a circular base. In order to achieve a homogeneous illumination of an object which is arranged in the center of the ring light, i.e. in the area of the circle close to the center, it is favorable to illuminate the object from every direction for each contrasting technique. For this purpose, it is favorable to divide the circular area into at least two, better three, even better into at least four circular sections, each having equal circular arcs, and to provide at least one segment with light sources for each intended contrasting technique in each circular section. With a subdivision into four circular sections, by way of example, 2*4=8 segments are then resulting in the case of two contrasting techniques, in which segments the light sources are divided evenly. A finer division of the circular area will result in an even more homogeneous illumination, however, the required wiring and control will also involve higher complexity.

The number of light sources 11 and the distribution of these light sources 11 to the segments is chosen such that the number of light sources 11 per segment is equal. Thus, in a particularly preferred embodiment, the number of light sources 11 is equal to or is a multiple of the number of intended segments.

However, the specific arrangement of light sources 11 and their division into segments requires the electrical connection of the light sources 11 to be configured such that the light sources 11 belonging to the segments of one switched unit can be switched on and off or modified in their intensity or in another parameter independently of those light sources 11 belonging to the segments of another switched unit. Therefore, a very large number of segments, for example more than 16 segments, requires correspondingly complex cabling and control.

FIG. 2 shows a polarizing element 20 according to the invention. A possible arrangement of the polarizing element 20 together with a ring light 30 in an imaging optical device 50 is shown in FIG. 5.

The polarizing element 20 shown merely by way of example in FIG. 2 is in the form of a flat, planar substrate and is geometrically adapted to the ring light 30 in terms of its outer dimensions. It furthermore has a central circular opening 22 about a center M with a diameter which advantageously corresponds at least to the diameter of the opening 12 of the ring light 30. This makes it possible to arrange the ring light 30 and the polarizing element 20 in the optical device coaxially to one another and coaxially to the objective lens of the optical device or coaxially to the optical path, so as to allow for a free view to the object through the eyepiece in the mounted position thereof.

The polarizing element 20 is formed with openings 21 which are arranged such that they are aligned with the beam path of light beams from the light sources 11 of the switched unit, which are directly incident on the object during operation. The openings 21 of the polarizing element 20 thus correspond to the segments of the ring light.

The ring light 30 and the polarizing element 20 are arranged at a small distance from one another in order to reduce the risk of shading effects or extraneous light exposure, in particular scattered light, in conjunction with the polarizing element 20. Preferably, the distance to the light sources of the lighting assembly is not more than 10 mm, preferably not more than 7 mm, and most preferably not more than 5 mm, in order to obtain a compact design of the lighting device and not restrict the measurement area too much, and on the other hand to avoid unwanted optical effects such as light diffraction at the edges of the openings of the polarizing element due to the segmented illumination during operation of the lighting device. Other distances are possible and conceivable. For example, different distances may result if the light sources are not arranged on a flat substrate, but on a curved base.

During operation of the lighting device, the light of the light sources 11 belonging to one switched unit can pass unhindered through the openings 21 of the polarizing element 20 to be incident on the object if no polarization is desired. By contrast, if polarization is desired, the radiation from the light sources 11 of another switched unit may be passed through the polarizing element 20 before being incident on the object.

For example, if the ring light 10 of FIG. 1 is coaxially connected to the polarizing element 20 to form a lighting device according to the invention, then, in operation, electromagnetic radiation from the light sources 11 belonging to segments A, A', A" and A'" will pass through the polarizing element 20 before being incident on the object. This means that the light from these light sources 11 will be polarized. Light from the light sources 11 belonging to segments B, B', B" and B'" will be incident on the object directly and is therefore not polarized.

In the exemplary embodiment shown, the polarizing element 20 is in the form of a polarizing film 23. Such film is very easily manufactured and can be adapted very well, in terms of geometry, to the ring light 10 or 30, with which it is to be used. The required openings 21 can then be produced very easily, for example by punching. In the illustrated example, the light sources 11' of the segments belonging to the contrasting technique without polarization are switched on, so that light beams of these light sources 11' can be emitted without polarization, in operation. Instead of a polarizing element with openings 21, it is of course also possible for a polarizing element 20 to be composed of individual segments which are matched in their shape with the segmented illumination.

In this exemplary embodiment, by switching the two switched units, i.e. switching on and off the light sources 11 of the one switched unit and those of the other switched unit, illumination of an object to be analyzed is achieved in a manner so that two different illumination techniques can be applied, which are distinguished in the polarization of the light incident on the object.

Regardless of the switching of the light sources 11, the average angle of inclination, under which the light from the light sources 11 is incident on the object, is also the same during the alternate switching of the light sources 11. This is due to the fact that the arrangement of the light sources 11 of each segment is the same with respect to the center M of the lighting device and that these light sources 11 are aligned at a respective equal angle.

Figure 3:
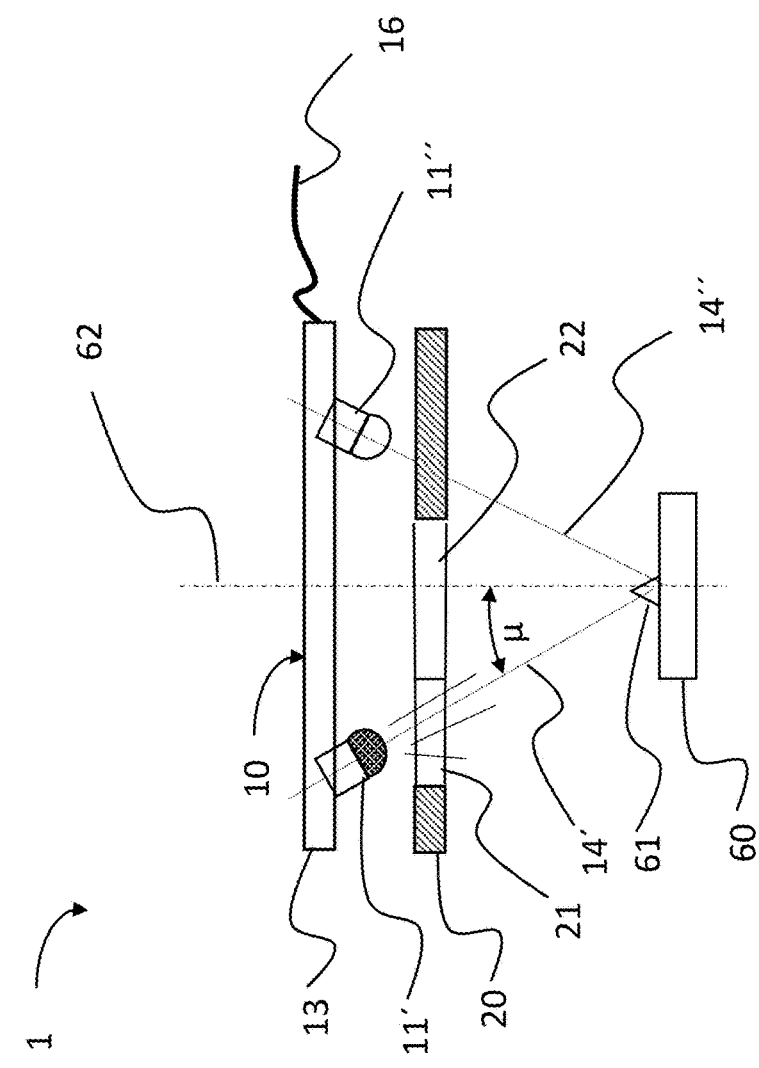
FIG. 3 schematically shows a side view of an illumination situation of a lighting device according to the invention.

FIG. 3 shows, merely schematically, a simple example of a typical illumination situation of a lighting device according to the invention. In this case, the lighting device is a ring light 10 which is shown in a side view. The ring light 10 comprises a support 13 to which the individual light sources 11 are mounted. The light sources 11 are oriented at an angle so that they are capable of illuminating an object arranged at a distance from the support 13. An microscope slide 60 is also shown, merely schematically, which typically forms part of the optical device 50 (not shown). An object 61 to be analyzed is placed on the microscope slide 60.

Furthermore, a polarizing element 20 is shown, also in a side view, which is arranged at a distance from the ring light 10. In their mounted position, the ring light 10 and the polarizing element 20 are arranged coaxially to the axis 62 of the objective lens of the imaging optical device 50. The spacing between ring light 10 and polarizing element 20 has been selected merely for the sake of clarity. In its mounted position, the lighting device is arranged coaxially to the axis 62 of the objective lens of the optical device.

The example illustrates a lighting situation in which one light source 11' is in operation and another light source 11" is not in operation. For the sake of clarity, no other light sources 11 are included in this view. Here, the light sources 11' and 11" are aligned such that the main emission direction 14', 14" of the light, as indicated by a respective dotted line in the drawing, defines the same angle µ with the optical axis 62. In this case, the optical axis 62 extends parallel to the surface normal of the microscope slide 60. Regardless of the operation of the individual light sources 11, 11', 11", this inclination angle µ is therefore equal. In the illustrated illumination situation, it can moreover be seen that light from light source 11', which is in operation, is directly incident on the object 61, through the opening 21 of the polarizing element. Upon switching, that is to say switching off light source 11' and switching on light source 11", the light from light source 11" will then pass through the polarizing element 20 to be linearly polarized in this way.

FIG. 4 shows another embodiment of a particularly suitable lighting arrangement, in which an annular arrangement of light sources 11 in two rows is provided. Such a double-row ring light 30, which is shown schematically in a plan view, is suitable for illuminating objects very brightly and homogeneously. Both rings comprise an equal number of light sources, which is preferential for a segmentation according to the invention. In the example, the inner and the outer ring each comprises 40 light sources 11, which are in the form of LED light sources. Due to the larger diameter of the circle of the outer ring, the spacing between the individual light sources 11 of the outer ring is greater than that between the individual light sources 11 of the inner ring.

FIG. 5 shows a perspective view of an exemplary embodiment illustrating how segmented illumination may be achieved during operation of the double-row ring light 30 of FIG. 4. The double-row ring light 30 is again divided into eight segments, each segment having an equal number of light sources. In the segmentation of an arrangement of light sources comprising two or more rows, care must be taken that the average angle of inclination of the light sources of each segment is preferably the same. In the present example, this is achieved by having an equal number of light sources 11 of the inner ring and an equal number of light sources 11 of the outer ring assigned to each segment. Accordingly, each segment of the double-row ring light 30 comprises an equal number of light sources 11 of the inner and outer rings. In the example, 5 light sources 11 of the inner ring and 5 light sources of the outer ring are assigned to each segment.

Figure 6:
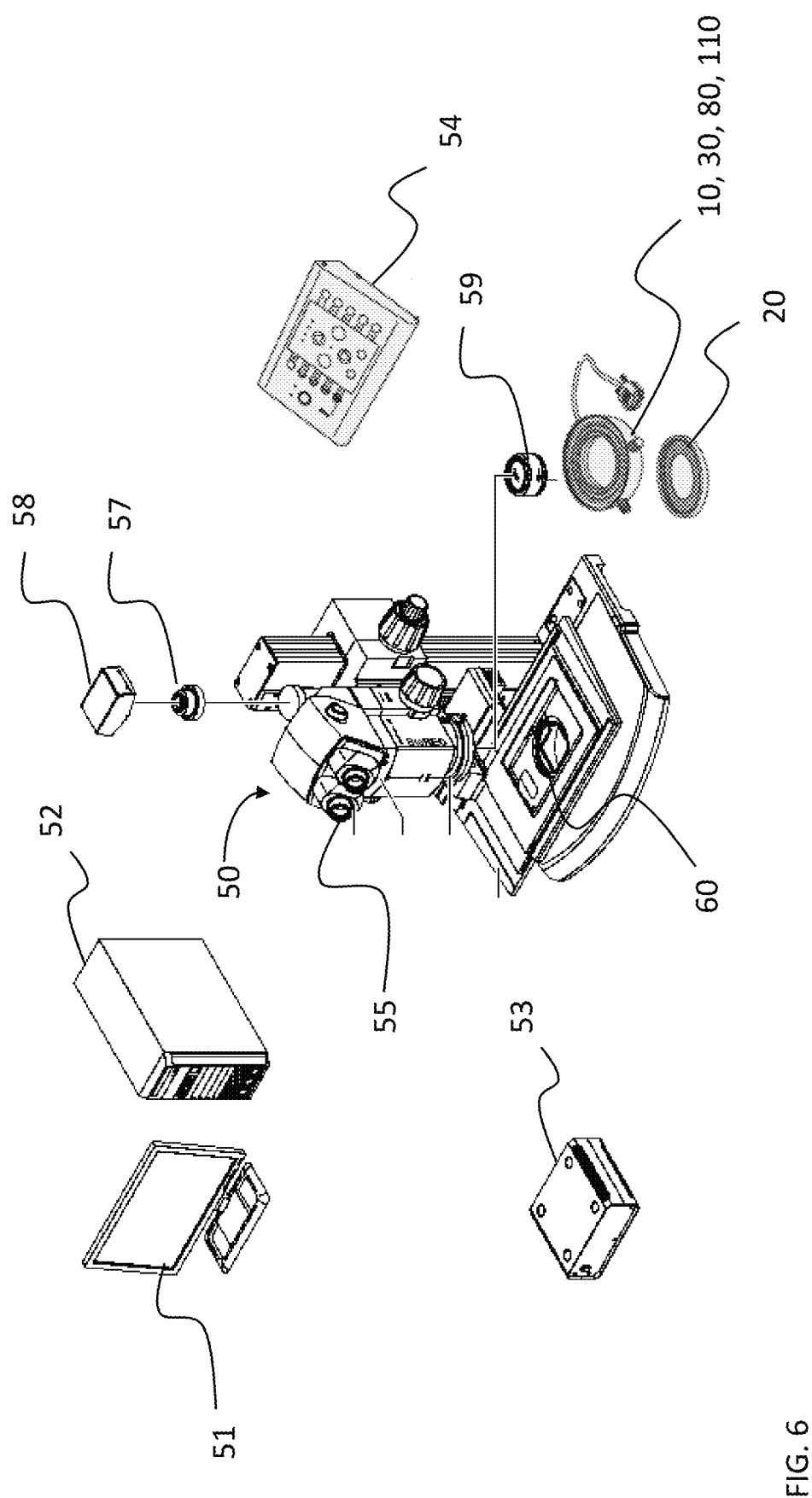
FIG. 6 shows an overview of an imaging optical system comprising a stereo microscope and a lighting device according to the invention.

FIG. 6 shows an overview of an optical system comprising an imaging optical device 50, in the example a stereo microscope, and a lighting device according to the invention. Illumination is provided in reflected light mode. Illumination in reflected light mode is necessary for non-transparent samples. In conjunction with a stereo microscope as the imaging optical device it is possible to achieve a high depth of field.

The illustrated optical system comprises a display device 51, a computer unit 52 on which memory and evaluation software may be provided, and an external control unit 53. A binocular phototube 55 allows a user to view the object to be analyzed (not shown). Furthermore, a camera unit 58 is provided which can be coupled with the imaging optical device 50 by means of an adapter 57.

Furthermore, an interchangeable objective lens 59 is provided. Together with the latter, the lighting device according to the invention comprising the lighting assembly, in the example a ring light 10 or 30, and a polarizing element 20, are connected to the optical device 50. Furthermore, an external control unit 54 is provided, which controls the ring light and can be connected to the computer unit 52.

The invention provides for electronic switching between at least two different contrasting techniques, for example for illumination with non-polarized light during operation of the one switched unit, and with polarized light during operation of the other switched unit. It is also possible to implement more than two different contrasting techniques using the lighting device according to the invention.

Switching between the contrasting techniques is often very helpful or even necessary for the evaluation of material properties of the object 61 observed using an imaging optical device 50 such as a microscope. Lighting devices according to the invention permit to implement at least two different contrasting techniques in an imaging optical device 50 independently of each other, and in this case the light sources 11 of the first and second switched units are accordingly operated alternately to each other.

The alternate operation is achieved by controlling the light sources 11 belonging to a switched unit via a control unit 54, for example, which connects the respective light sources to power. Control unit 54 is an external device in the example, but may also form part of the lighting device or may else be integrated into the imaging optical device. In the exemplary embodiment of FIG. 6, the optical system furthermore comprises an external user interface with a separate control unit 53, so that an operator can take control. Thus, the lighting device of the invention is particularly well suited to be operated together with an imaging optical device 50 for microscopic analysis.

In this way it is possible, for example, to detect metallic particles in a particle accumulation. For this purpose, two images of the object 61 are compared with each other, and these two images differ in the illumination when producing the image, in particular their polarization settings. Accordingly, a first image is generated with polarized light and a second image with non-polarized light, and subsequently image analysis software is used, for example, to determine the dimensions and the position, and, as far as possible, the nature of the particle from the two images of the object.

The images of the object 61 to be analyzed in the imaging optical device may be viewed either by the operator, via phototube 55, or via the digital or video camera 58 which captures the images. For evaluation, the computer unit 52 advantageously comprises a memory and also image analysis software or other computer-aided analysis methods for automatic morphological analysis, preferably for the detection of metallic particles. The distinction between metallic particles and non-metallic particles is then made on the basis of the reflection behavior thereof. The switching between the at least two different polarization settings is achieved purely electrically.

This provides for a maintenance-free and low-vibration operation in the alternate switching between the contrasting techniques, since there are no moving parts involved. Moreover, the change between the two contrasting techniques takes place solely by a switching operation of the computer unit or an electrical signal, so that the switching takes place virtually without loss of time. This makes it possible to alternately analyze a large number of images or image sections in the shortest possible time.

In one embodiment of the invention, the brightness of the light sources 11 is adjusted during operation, depending on the contrasting technique. The luminous intensity of those light sources 11 which emit directly towards the object, i.e. which correspond to the bright field illumination, is reduced, while the light sources 11 from which the light passes through the polarizing element 20 are not dimmed during operation. It is of course also possible to use light sources 11 of different brightness to compensate for the differences in brightness, provided that a constant luminous flux per unit area is obtained on the object so that illuminance remains approximately the same, preferably constant.

The lighting device according to the invention can be flexibly combined with a variety of designs of ring lights 10, 30. This allows it to be used, for example, for microscopes, especially for stereo microscopes, even for stereo microscopes that comprise a plurality of objective lenses simultaneously mounted on an objective lens revolver and in which particularly narrow ring lights 10 are used.

The invention thus provides a method for illuminating an object, preferably for illuminating an object 61 to be analyzed in the measurement area of a magnifying optical device 50, in which the object 61 is illuminated by a lighting device alternately with at least a first and a second contrasting technique so as to allow for an analysis in at least two different contrasting techniques.

The method offers the great advantage that the shadow cast of the object and the brightness can be kept constant, regardless of the contrasting technique currently used.

The invention thus furthermore provides a method for optical analysis of an object 61, for example for residual contamination analysis, in which an object 61 to be analyzed is placed in the measurement area of a magnifying optical device 50 and the object 61 is illuminated by the lighting device, alternately with different contrasting techniques.

The object 61 may be a single sample which is placed on a microscope slide 60 in the measurement area of the imaging optical device 50. For analysis, i.e. during operation of the imaging optical device, the sample is then illuminated accordingly.

For detecting metallic particles in a particle accumulation in the context of a residual contamination analysis, it is however also possible to accordingly prepare a filter membrane as explained above, which is then analyzed in the measurement area of the optical device 50 using the imaging optical device 50 and the lighting device according to the invention. Such a planar substrate, which might project beyond the image area of the magnifying optical device 50, can be analyzed section by section. For this purpose, the magnifying optical device 50 is advantageously equipped with a suitable displacement mechanism which enables automatic operation. This automatic operation for sectionwise analysis of the object 61 or of a filter membrane is advantageously coupled with the lighting device according to the invention so that, for example, the intended contrasting techniques can be employed for analysis directly for each image section, and only when both images have been captured the object is moved to view the next section.

Accordingly, a filter membrane can be automatically evaluated in a rastering fashion, for example, by automatically exposing each image section of the object alternately to polarized and non-polarized light and then displacing the object section by section. The comparison of the at least two images per image section may then be achieved in computer-assisted manner in the computer unit 52.

Figure 7B:
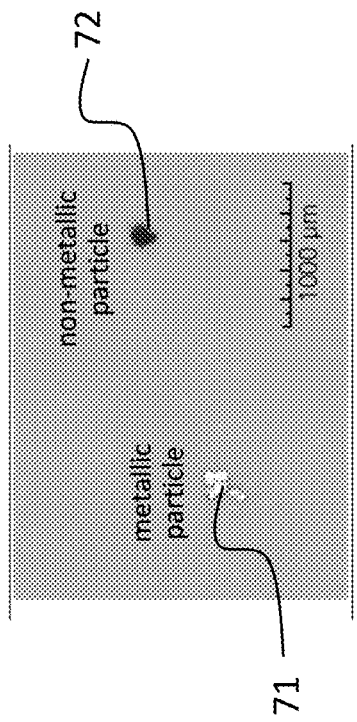
FIGS. 7a and 7b show two image sections of a particle accumulation in different contrasting techniques.
Figure 7A:
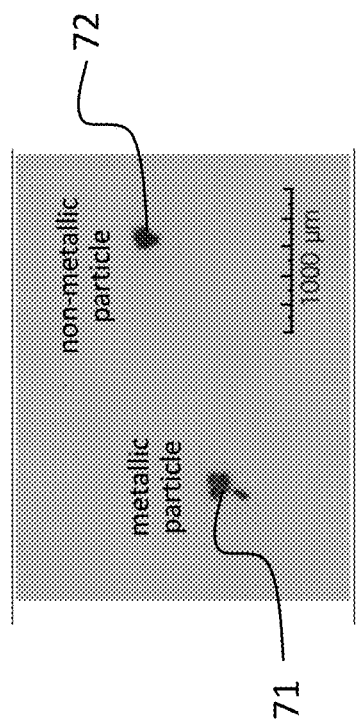

FIGS. 7*a* and 7*b* show two image sections of a particle accumulation on a filter membrane under different contrasting techniques. In FIG. 7*a*, which shows an image section with polarized illumination using a polarizing element rotated by 90° in front of the camera, only the outer contours of the two particles 71, 72 present on the filter membrane can be seen. In FIG. 7*b*, which shows the same image section, the image was captured under non-polarized illumination. Clearly visible is the metallic shining of particle 71.

The inventive method thus allows to perform a fully automated analysis of the filter membrane in the context of a residual contamination analysis, in which the filter membrane is alternately exposed to polarized and non-polarized light. Due to the rapid, purely electrical switching between polarized and non-polarized light, it is possible to analyze the entire object with alternate illumination in a single pass. It is in particular not necessary to first produce a first series of images of the object using a first contrasting technique and then a second series of images of the object using a second contrasting technique, which involves the drawback that each image section of the object has to be addressed twice so that the entire object is scanned twice in a rastering fashion. The method thus permits to detect metallic particles among a particle accumulation on the filter membrane in a particularly simple and reliable manner.

The imaging optical system 50 as shown in FIG. 6 may comprise a ring light and/or a control unit VisiLED MC1500, as available from SCHOTT AG, Mainz. This control unit provides for one-eighth segment illumination and switching by ⅛ segment, respectively, what makes it particularly well suited for enabling alternate switching between polarization and non-polarization.

The memory buttons of the MC1500 may also be assigned to different illumination intensities for the two illumination situations, i.e. polarization and non-polarization. They are optionally switchable via a foot-operated switch. Both the ring lights and the MC1500 can be used with the lighting device according to the invention without further modification, so that only a perforated polarizer matched to the ring light has to be produced.

Figure 8:
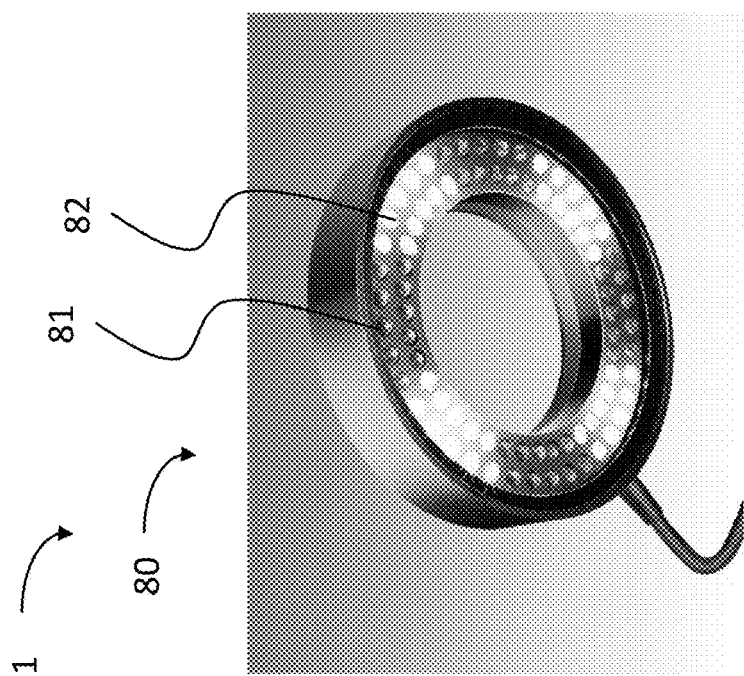
FIG. 8 shows a perspective view of a ring light which allows to change back and forth between two contrasting techniques by electronic switching.

FIG. 8 shows another embodiment of the lighting device according to the invention. In this example, a ring light 80 is provided, which is configured to allow for a change between two contrasting techniques by electronic switching, which change of the contrasting technique involves a change in the wavelength or wavelength range or wavelength spectrum of the electromagnetic radiation emitted by the light sources 81, 82.

Thus, the lighting device comprising the ring light 80 allows to implement two different contrasting techniques with different wavelengths. For this purpose, the light sources 81, 82 are again evenly divided into segments, in the example into eight segments in total, and are wired accordingly so that they can be switched independently. However, the light sources 81 are adapted to emit UV light, i.e. to emit electromagnetic radiation in the UV wavelength range, whereas the light sources 82 are adapted to emit light in the visible wavelength range. The ring light 80 is not equipped with a polarizing element 20 in this example. However, it is of course possible for the ring light 80 to provide a further contrasting technique, for example for illumination with polarization. For this purpose, a polarizing element 20 as discussed above can be added, and in this case the openings 21 are matched according to the segmented illumination.

It will be apparent that the embodiments illustrated here allow for various possible combinations for implementing different contrasting techniques in a lighting device for illuminating an object to be analyzed, preferably for illuminating an object in an imaging optical device for microscopic analysis in at least two different contrasting techniques.

Contrasting techniques in the UV wavelength range are suitable for a crack test, for example, in which a fluorescent liquid is applied to a material surface, which is drawn into any existing cracks due to capillary forces and can be detected using this contrasting technique under UV light.

Similarly, paint tests may be performed using the lighting device according to the invention, for example in order to check a paint coating applied to a surface for inclusions, thickenings, or cracks.

Besides the aforementioned filter membranes in the context of particle analysis, it is of course possible to analyze any other materials or items.

In a particular embodiment of the invention, the lighting device 1 comprises at least one contrasting technique with illumination under fluorescence, preferably in the form of UV bright-field illumination. This may be combined with at least one second contrasting technique in different ways, for example with normal bright-field illumination and/or with illumination with polarization.

Figure 9A:
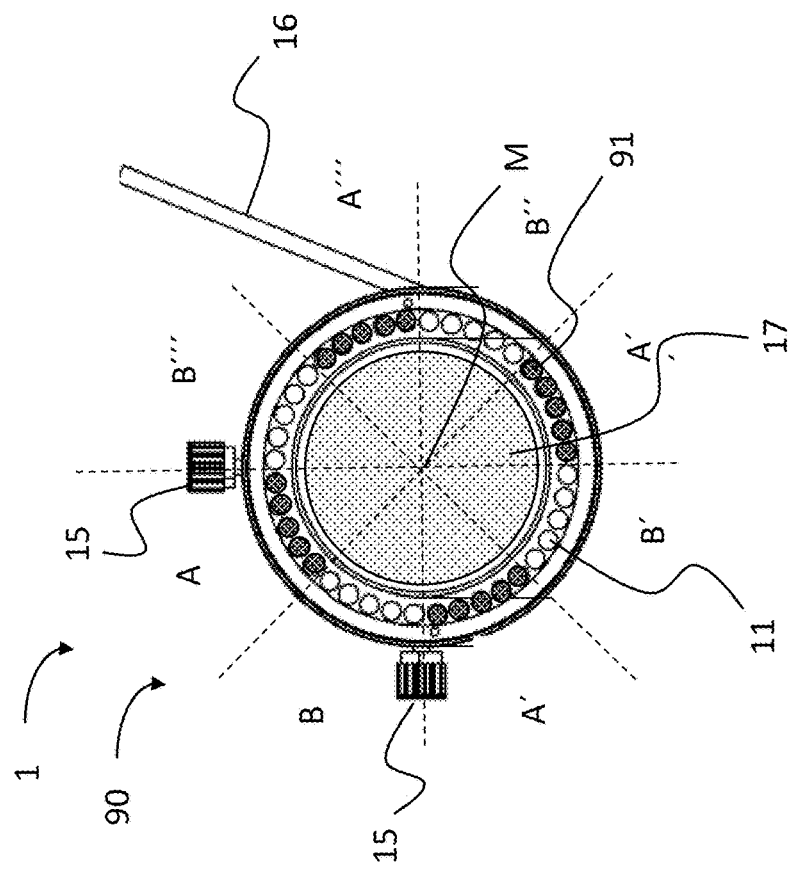
FIG. 9a shows an embodiment of the ring light of FIG. 1 comprising one row of annularly arranged light sources for an intended contrasting technique under fluorescence.

Merely by way of example, FIG. 9a shows such an embodiment of the ring light shown in FIG. 1 and comprising light sources annularly arranged in a single row, which is used for a contrasting technique under fluorescence in combination with a bright-field contrasting technique. Thus, the lighting device 1 allows analysis using a contrasting technique under bright-field illumination and under fluorescence illumination, preferably with the same averaged illumination angles and the same averaged distances of the segments used.

Instead of the bright-field illumination, an analysis under illumination with polarization may be provided as well as a matter of course.

It is also possible, for example, to additionally integrate a third contrasting technique, for example for analyzing a sample under bright-field illumination, under fluorescent illumination, and under illumination with polarization.

For this purpose, the lighting device 1 comprises light sources with at least two different emission characteristics with regard to the wavelength of the electromagnetic radiation. On the one hand, light sources 11 are provided, which are LED light sources in the present example, as shown in the exemplary embodiment of FIG. 1, and on the other hand UV light sources 91, which are LEDs with an ultraviolet emission characteristic in the present example, so-called UV LEDs. These may be UV LEDs with a preferably narrow-band emission characteristic, for example, and/or with a maximum of the intensity of the electromagnetic radiation at a wavelength of, for example, approximately 365 nm, 375 nm, or else 380 nm, as available from Nichia, for example.

Figure 10:
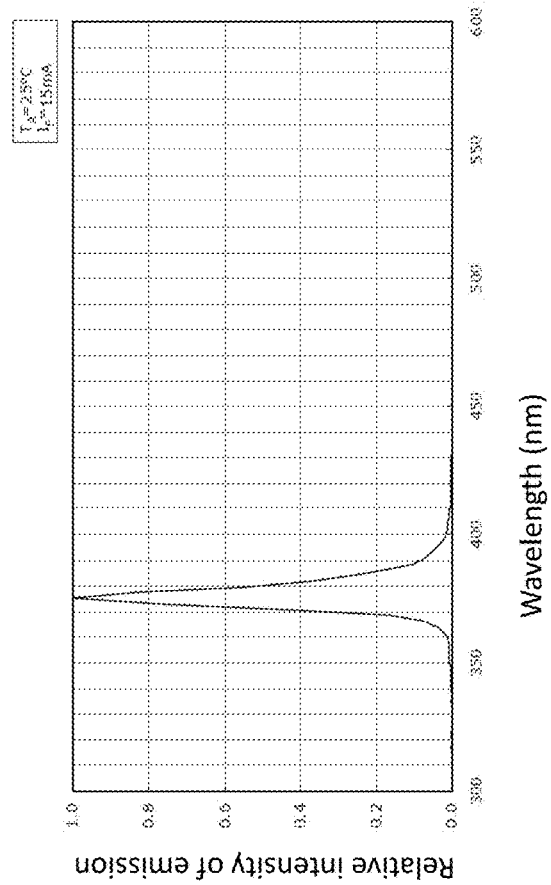
FIG. 10 shows an exemplary diagram of the emission spectrum of a UV light source suitable for the invention for a contrasting technique under fluorescence.

FIG. 10 shows, merely by way of example, a diagram of the emission spectrum of such a UV light source for a contrasting technique under fluorescence, with a maximum intensity of the emission at a wavelength of approximately 375 nm in this case.

The lighting device 1 is in the form of a ring light 90, similarly to the other ones shown. As can be clearly seen from FIG. 9a, and without limitation to the exemplary embodiment, each segment A, A', A'', A''', B, B', B'', B''' includes the same number of light sources 11, 91. In other words, the number of light sources 11 and UV light sources 91 is identical. In the example, each segment includes five light sources 11, 91 in each case, and with four segments in each switched unit the lighting device 1 therefore comprises a total of 20 "normal" light sources 11 and furthermore 20 UV light sources 91.

However, it should be taken into account here that usually consistent illumination is intended and desirable, in particular in terms of illuminance. What can be achieved in this way is that the shadow cast and the brightness of the object do not change during the analysis when changing the contrasting technique. As a consequence thereof, the number of UV light sources 91 may be different from the number of other light sources 11, for example by providing more UV light sources 91 than other light sources 11, in order to achieve the most homogeneous illuminance possible.

However, in the sense of the invention it is usually advantageous if at least the arrangement of the light sources 11, 91 is identical in each of the segments of a switched unit in order to achieve a homogeneous shadow cast even upon a change in the contrasting technique.

What can furthermore clearly be seen in the example is that the averaged angle of inclination under which the light from the light sources 11, 91 of a segment is incident on the object is identical. This requirement can be met particularly easily by having all the light sources 11, 91 arranged at a consistent distance from the center M and by an identical arrangement of the light sources 11, 91 in each segment, as illustrated.

In this way, a lighting device 1 comprising the ring light 90 allows in a particularly advantageous manner to analyze a sample both under fluorescence illumination and with a further contrasting technique, and consistent homogeneous illumination can be provided with equal averaged angles of incidence. The lighting device 1 comprising the ring light 90 is therefore particularly useful in or in conjunction with an optical device 50 for fluorescence microscopy.

If image capturing devices or a camera 58 are intended to be used for the further analysis, in particular a digital camera or a video camera, such camera is preferably configured so as to be capable of preferably acquiring images in the visible, optionally even into the infrared wavelength range, which is however not provided in all suitable types of cameras, so that an unwanted UV component can or has to be compensated, for example by UV blocking filters, in order to obtain faithful images.

According to the invention, it is additionally contemplated for the lighting device for illuminating an object to be analyzed and/or for the imaging optical device for optical, in particular (light) microscopic analysis, such as a stereomicroscope, to be equipped with an appropriate blocking filter, in particular a UV blocking filter, which is capable of blocking electromagnetic radiation in particular in the ultraviolet range. In a particularly preferred embodiment, the ring light 90 therefore comprises a UV blocking filter which, as already described above, is advantageous for protecting the eyes of an observer and/or for the faithful acquisition of images with cameras that are also sensitive in the UV range.

Figure 9B:
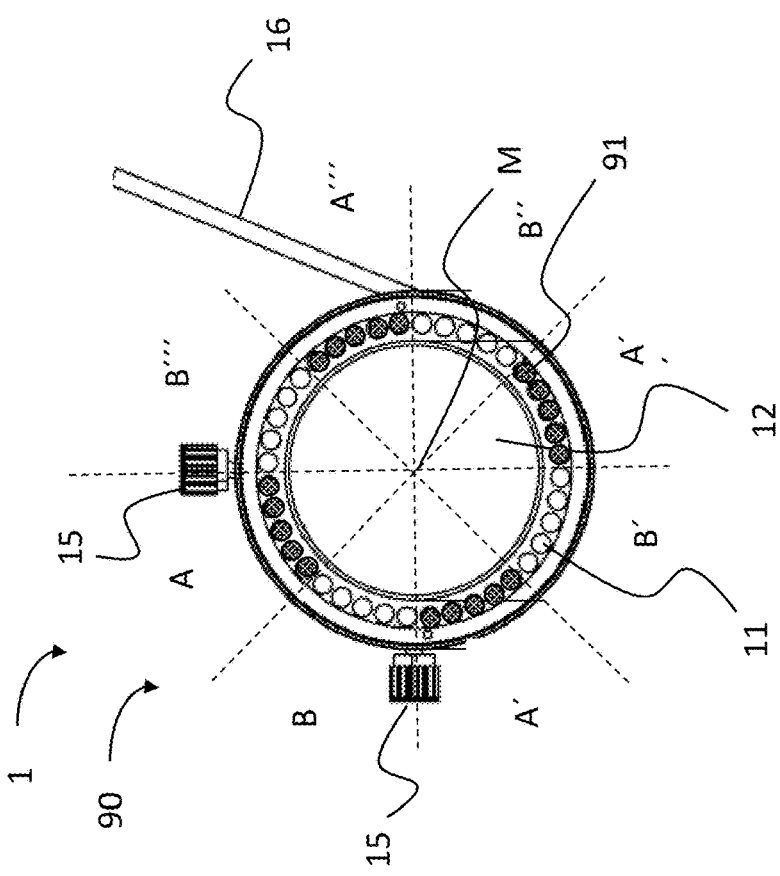
FIG. 9b shows an embodiment of the ring light of FIG. 1 comprising one row of annularly arranged light sources with integrated blocking filter.

In the exemplary embodiment of FIG. 9b, the ring light 90 is shown with a filter or blocking filter 17 in the form of a color filter or long pass filter, in the present example an LP 435, as available from Schott, Mainz. The blocking filter 17 is arranged in the central area of the ring light 90.

Alternatively, it is also possible, for example, to use a steeper band blocking filter 17, for example an appropriately coated interference filter, such as an LP 420, also available from Schott, Mainz.

A blocking filter LP 345, also available from Schott, Mainz, is likewise suitable for the invention.

Favorably, the blocking filters and UV light sources should be matched to one another at least in terms of the wavelength spectra.

Figure 11:
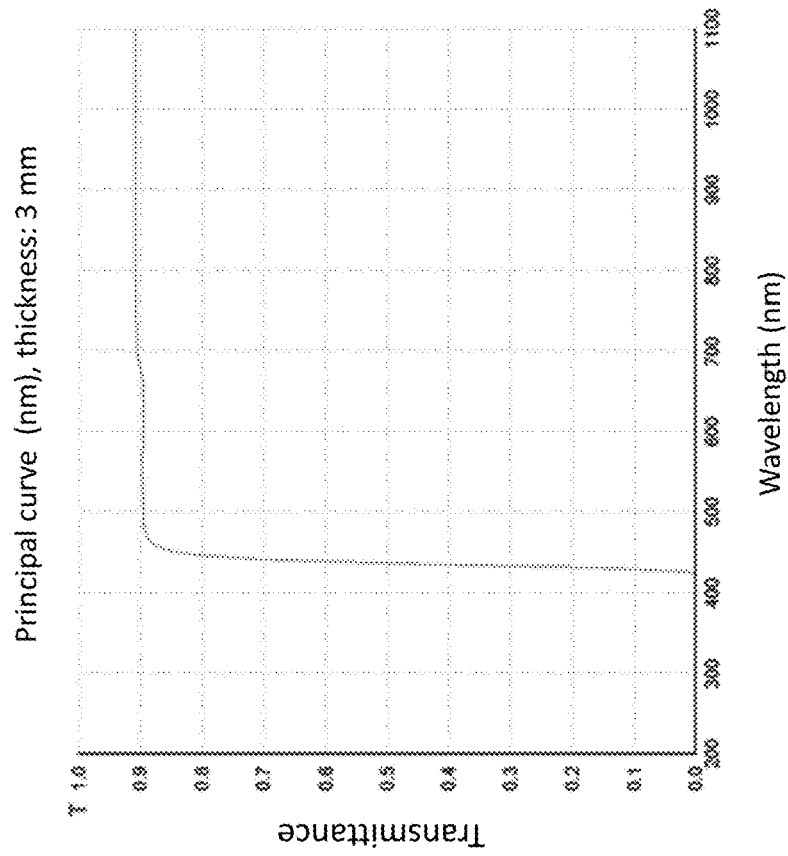
FIG. 11 shows an exemplary diagram of the transmittance behavior of a UV blocking filter suitable for the invention.

Finally, FIG. 11 shows an exemplary diagram of the transmittance behavior of a suitable UV blocking filter by way of an exemplary long pass filter LP 435, available from Schott, Mainz.

LIST OF REFERENCE NUMERALS

| | |
|---|---|
| 1 | Lighting device |
| 10 | Ring light |
| 11, 11', 11", 11'" | Light source |
| 12 | Opening |
| 13 | Support |
| 14', 14" | Emission direction |
| 15 | Adjusting wheel |
| 16 | Connection line |
| 17 | Blocking filter |
| 20 | Polarizing element |
| 21 | Recess |
| 22 | Opening |
| 30 | Ring light |
| 50 | Optical device |
| 51 | Display device |
| 52 | Computer unit |
| 53 | Control unit |
| 54 | Control unit |
| 55 | Phototube |
| 57 | Adapter |
| 58 | Camera |
| 59 | Interchangeable objective lens |
| 60 | Microscope slide |
| 61 | Object, sample |
| 62 | Objective lens axis |
| 71 | Particle |
| 72 | Particle |
| 80 | Ring light |
| 81 | Light source |
| 82 | Light source |
| 90 | Ring light |
| 91 | UV light source |
| A, A', A", A'" | Segment |
| B, B', B", B'" | Segment |
| M | Center |

What is claimed is:

1. A lighting device for illuminating an object, comprising:
    a controlling device; a plurality of light sources configured to emit electromagnetic radiation towards the object, the plurality of light sources being formed about a central opening, the plurality of light sources being divided into a plurality of first segments and a plurality of second segments, each of the plurality of segments comprising at least two of the plurality of light sources and each of the plurality of second segments comprising at least two of the plurality of light sources, and the plurality of first segments being non-adjacent to one another and the plurality of second segments being non-adjacent to one another;
    a first switched unit defined by the plurality of first segments and operatively connected to the controlling device, wherein the first switched unit is associated with a first contrasting technique;
    a second switched unit defined by the second plurality of segments and operatively connected to the controlling device, wherein the second switched unit is associated with a second contrasting technique;
    wherein the controlling device is configured to independently control the first switched unit and the second switched unit from each other;
    wherein a polarizing element in a beam path between the first and/or second segments and the object; and
    the polarizing element comprises openings which are arranged so as to be aligned with the beam path.

2. The lighting device of claim 1, wherein the plurality of light sources are annularly arranged to define a ring light.

3. The lighting device of claim 1, wherein the plurality of light sources are selected from a group consisting of semiconductor-based light sources, light-emitting diodes (LEDs), laser diodes, fiber optic light guides, UV light sources, UV light-emitting diodes, UV light sources with narrow-band emission characteristic, UV light sources with a maximum intensity at a wavelength of 365 nm, UV light sources with a maximum intensity at a wavelength of 375 nm, UV light sources with a maximum intensity at a wavelength of 380 nm, and combinations thereof.

4. The lighting device of claim 1, wherein the first and second segments comprise an equal number of light sources.

5. The lighting device of claim 1, wherein the more than one of the plurality of light sources each have an averaged angle of inclination that is equal.

6. The lighting device of claim 1, wherein the first and second contrasting techniques differ from one another by a feature selected from a group consisting of a wavelength of the emitted light, a polarization of the emitted light, and combinations thereof.

7. The lighting device of claim 1, wherein the first and second contrasting techniques are selected from a group of illumination techniques consisting of: bright-field, dark-field, polarization, oblique illumination, and fluorescence.

8. The lighting device of claim 1, wherein the controlling device is configured to switch between the first and second contrasting techniques in less than 500 milliseconds.

9. The lighting device of claim 1, wherein the at least one of the plurality of light sources of the first and/or second segments is configured to emit polarized light.

10. The lighting device of claim 1, wherein the controlling device is configured to control a luminous intensity of the first and/or second switched units.

11. The lighting device of claim 1, further comprising one of a blocking filter, a UV blocking filter, a color filter LP 435, a color filter LP 420, and a color filter LP 345.

12. A method for illuminating an object, comprising:
    illuminating an object to be analyzed in an optically detectable measurement area of a magnifying optical device with light from a first switched unit, the light being configured for a first contrasting technique;
    switching from the first switched unit to a second switched unit; and
    illuminating the object to be analyzed in the optically detectable measurement area of the magnifying optical device with light from the second switched unit, the light being configured for a second contrasting technique, wherein the light for the first and second contrasting techniques differ from one another by a feature selected from a group consisting of a wavelength of the light, a polarization of the light, and combinations thereof, and wherein the first switched unit and the second switched unit comprise a plurality of light sources formed about a central opening, the plurality of light sources being divided into a plurality of first segments and a plurality of second segments, each of the plurality of first segments comprising at least two of the plurality of light sources and each of the plurality of second segments comprising at least two of the plurality of light sources, and the plurality of first segments being non-adjacent to one another and the plurality of second segments being non-adjacent to one another, the first switched unit being defined by the plurality of first segments and the second switched unit being defined by the plurality of second segments.

13. The method of claim 12, wherein the first and second contrasting techniques are selected from a group of illumination techniques consisting of: bright-field, dark-field, polarization, oblique illumination, and fluorescence.

14. The method of claim 12, wherein the switching between the first and second switched units takes less than 500 milliseconds.

15. A method for optical analysis of an object, comprising:

placing an object to be analyzed in a measurement area of a magnifying optical device; and alternately subjecting an image section of the object in the measurement area to at least two different contrasting techniques using a lighting device, the at least two different contrasting techniques differ from one another by a feature selected from a group consisting of a wavelength of the light, a polarization of the light, and combinations thereof, and therewith obtaining at least two images of the image section having the same viewing direction of the measurement area; and comparing the at least two images, the lighting device having a first switched unit and a second switched unit comprising a plurality of light sources formed about a central opening, the plurality of light sources being divided into a plurality of first segments and a plurality of second segments, each of the plurality of first segments comprising at least two of the plurality of light sources and each of the plurality of second segments comprising at least two of the plurality of light sources, and the plurality of first segments being non-adjacent to one another and the plurality of second segments being non-adjacent to one another, the first switched unit being defined by the plurality of first segments and the second switched unit being defined by the plurality of second segments.

* * * * *